(12) United States Patent
Montemerlo et al.

(10) Patent No.: US 11,853,070 B2
(45) Date of Patent: Dec. 26, 2023

(54) UPDATING ROAD GRAPHS FOR AUTONOMOUS DRIVING

(71) Applicant: Waymo LLC, Mountain View, CA (US)

(72) Inventors: Michael Montemerlo, Mountain View, CA (US); Peter Michal Pawlowski, Menlo Park, CA (US); Joy Weng Zhang, Belmont, CA (US)

(73) Assignee: Waymo LLC, Mountain View, CA (US)

( * ) Notice: Subject to any disclaimer, the term of this patent is extended or adjusted under 35 U.S.C. 154(b) by 233 days.

(21) Appl. No.: 17/012,458

(22) Filed: Sep. 4, 2020

(65) Prior Publication Data

US 2022/0075382 A1 Mar. 10, 2022

(51) Int. Cl.
*G01C 21/00* (2006.01)
*G05D 1/02* (2020.01)
*G01C 21/34* (2006.01)
*G01C 21/36* (2006.01)
*G06V 20/56* (2022.01)

(52) U.S. Cl.
CPC ....... *G05D 1/0219* (2013.01); *G01C 21/3446* (2013.01); *G01C 21/3602* (2013.01); *G05D 1/0251* (2013.01); *G05D 1/0253* (2013.01); *G05D 1/0274* (2013.01); *G06V 20/56* (2022.01)

(58) Field of Classification Search
None
See application file for complete search history.

(56) References Cited

U.S. PATENT DOCUMENTS

| 10,838,065 | B2 * | 11/2020 | Olson | G01S 17/42 |
| 2010/0215250 | A1 * | 8/2010 | Zhu | G06F 16/29 |
| | | | | 382/154 |
| 2015/0269734 | A1 * | 9/2015 | Lee | G01C 21/3602 |
| | | | | 382/103 |
| 2016/0335887 | A1 * | 11/2016 | Dorum | G08G 1/0129 |
| 2017/0371348 | A1 * | 12/2017 | Mou | G01S 17/87 |

(Continued)

FOREIGN PATENT DOCUMENTS

WO WO-2018221455 A1 * 12/2018

OTHER PUBLICATIONS

Pfister, Hanspeter, et al. "Surfels: Surface elements as rendering primitives." Proceedings of the 27th annual conference on Computer graphics and interactive techniques. 2000. (Year: 2000).*

(Continued)

*Primary Examiner* — Jeffrey C Boomer
(74) *Attorney, Agent, or Firm* — Fish & Richardson P.C.

(57) ABSTRACT

Methods, systems, and apparatus, including computer programs encoded on computer storage media, for updating data of a map. One of the methods includes storing a map of an environment, the map comprising surfels and a road graph; receiving new surfel data for the surfels; adjusting the surfels based on the new surfel data; determining a vector field difference between the surfels of the stored map and the adjusted surfels; adjusting a portion of the road graph based on the vector field difference; generating an updated map comprising the adjusted surfels and the adjusted portion of the road graph; and storing the updated map.

20 Claims, 10 Drawing Sheets

(56) References Cited

U.S. PATENT DOCUMENTS

2019/0026943 A1* 1/2019 Yan .................. G06T 7/586
2019/0049242 A1* 2/2019 Adams ............... G01C 25/00
2019/0258737 A1* 8/2019 Wang ................ G06F 16/287
2021/0110512 A1* 4/2021 Hussain ............. H04N 19/117

OTHER PUBLICATIONS

Ryde, Julian, Vikas Dhiman, and Robert Platt. "Voxel planes: Rapid visualization and meshification of point cloud ensembles." 2013 IEEE/RSJ International Conference on Intelligent Robots and Systems. IEEE, 2013. (Year: 2013).*

* cited by examiner

UPDATING ROAD GRAPHS FOR AUTONOMOUS DRIVING

BACKGROUND

This specification relates to generating environment representations for use by autonomous vehicles.

Autonomous vehicles include self-driving cars, boats, and aircraft. Autonomous vehicles use a variety of on-board sensors in tandem with map representations of the environment in order to make control and navigation decisions.

Some vehicles use a two-dimensional or a 2.5-dimensional map to represent characteristics of the operating environment. A two-dimensional map associates each location, e.g., as given by latitude and longitude, with some properties, e.g., whether the location is a road, or a building, or an obstacle. A 2.5-dimensional map additionally associates a single elevation with each location. However, such 2.5-dimensional maps are problematic for representing three-dimensional features of an operating environment that might in reality have multiple elevations. For example, overpasses, tunnels, trees, and lampposts all have multiple meaningful elevations within a single latitude/longitude location on a map.

SUMMARY

This specification describes how a system that generates environment representations for autonomous vehicle navigation can use updated surfel data to adjust a road graph. The system can for example maintain one or more environment representations, e.g., surfel maps and road graphs. A vehicle, e.g. an autonomous or semi-autonomous vehicle, can navigate through an environment using these environment representations. The system can receive new sensor measurements, and can update the surfel map using the new sensor measurements.

A surfel map can include a plurality of surfels. In this specification, a surfel refers to data representing a two-dimensional surface corresponding to a detected object at a particular three-dimensional location in an environment. The surfels can represent various features of the environment.

In this specification, a road graph is data that represents routes that can be used for travel and navigation, e.g., vehicular travel routes. A road graph can include paths, e.g., arranged in a grid or a graph, that define places or routes on which vehicles are allowed to travel. For example, the paths defined by a road graph can define boundaries of vehicle routes, demarcations or centers of lanes of vehicle routes, and intersections, to name just a few examples.

The mapping system can receive new sensor measurements, e.g., camera imagery data and LIDAR detections, corresponding to features of an environment. The new sensor measurements can be generated, for example, by sensors of vehicles in the environment. In some cases, new sensor measurements differ in significant ways from previous environment representation. This can be because the new measurements are generated by an updated or revised computational algorithm, e.g., a new algorithm for generating surfel maps, which can for example result in a new surfel map that better approximates the actual geometry of the environment. In some other cases, it can simply be because the environment has actually changed, e.g., when a road or an overpass gets rebuilt and shifts slightly in the process. The mapping system can adjust the surfels of the surfel map based on the new sensor measurements.

Based on those adjustments, the mapping system can then adjust the road graph in a particular location based on the adjustments made to the surfel map in that location. For example, the mapping system can determine a vector field difference between an initial surfel position and a final surfel position in the adjusted surfel map. The mapping system can then apply the same vector field difference to corresponding portions of the road graph, e.g., road graph segments that are near the adjusted surfel, road graph segments that are mapped to the surfel, or road graph segments that share coordinates with the surfel.

Particular embodiments of the subject matter described in this specification can be implemented so as to realize one or more of the following advantages.

Using techniques described in this specification, a mapping system can automatically update a road graph based on changes to a surfel map. For example, the mapping system can receive new data related to a position of a building located near a roadway. The mapping system can update the subset of surfels of the surfel map that represent the building. The mapping system can then update the road graph, e.g., the road graph representing the roadway near the building, based on the adjustment of the subset of surfels that were updated.

By updating a subset of surfels based on new data, and then adjusting the road graph in a similar manner, the mapping system can improve the efficiency of automatically maintaining high-quality road graphs. The mapping system can update the road graph more quickly and more frequently and with less data processing than with prior techniques that may require rebuilding the entire road graph from scratch. In addition, the mapping system can take advantage of relationships between surfels and the road graph to apply updates for a subset of the map to the entire road graph.

Additionally, by updating a subset of surfels based on new data, the mapping system can maintain continuity of the road graph. For example, the mapping system can collect data related to features, e.g., foliage, buildings, landforms, etc., near a portion of the road graph. Based on known associations between the features and the portion of the road graph, the mapping system can update the road graph based on the collected data related to the features to maintain the known associations. The mapping system can thus maintain an updated road graph while reducing discontinuities and inaccuracies.

In addition, using techniques described in this specification, the mapping system can update a road graph when only data related to certain features is available. For example, the mapping system can receive sensor data that includes a new position or shape of a feature in an environment, such as a landform. The mapping system can adjust surfels representing the updated position and shape of the feature. The mapping system can then adjust portions of the road graph in the environment based on the changes made to the feature. Thus, the mapping system can update multiple portions of the road graph of the map of the environment, based on new data related to only a single feature or a few features of the environment.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
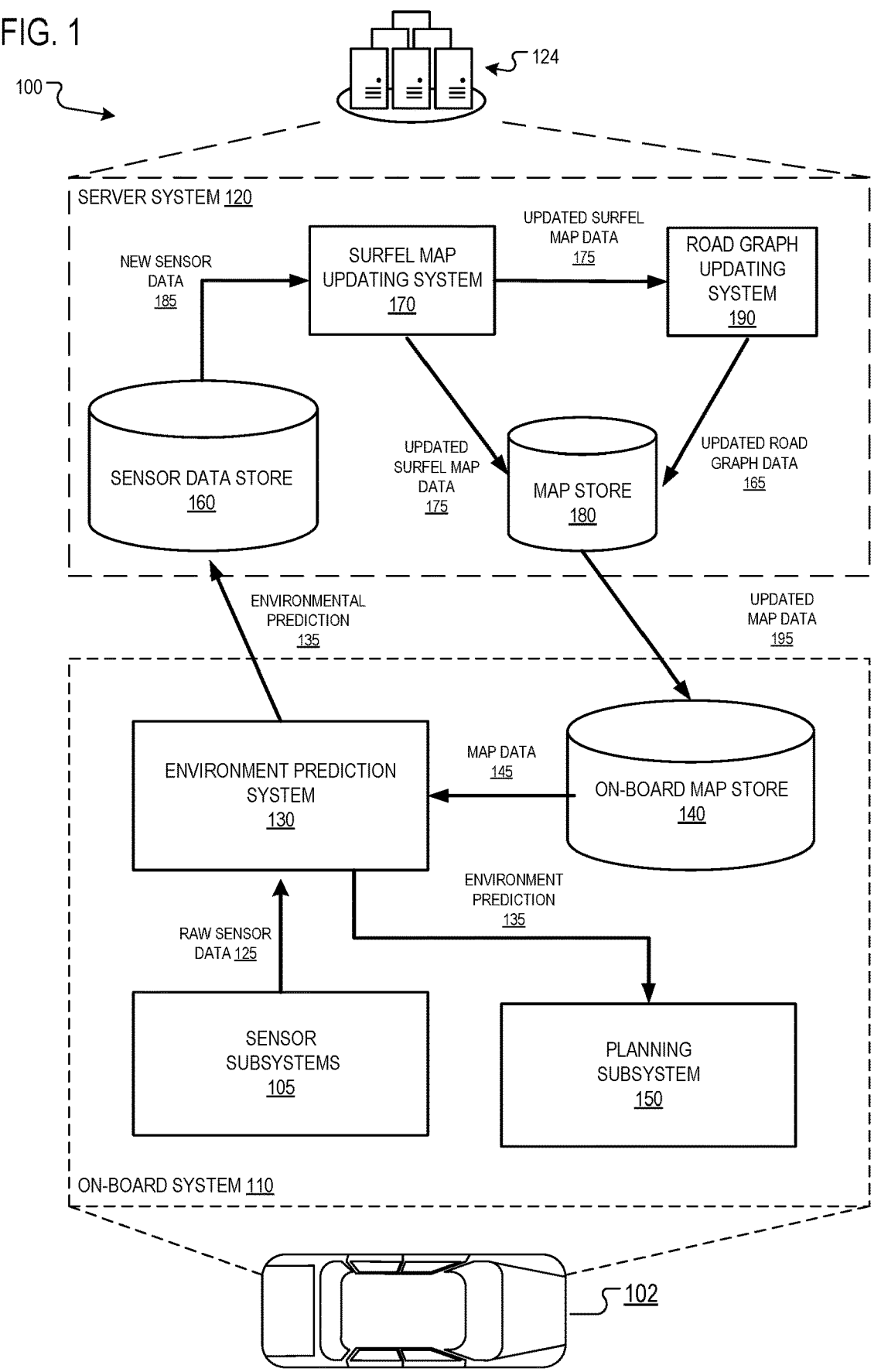
FIG. 1 is a diagram of an example system.

This specification describes how a system can use updated surfel data to update a road graph.

In this specification, a surfel is data that represents a two-dimensional surface that corresponds to a particular three-dimensional coordinate system in an environment. A surfel can include data representing a position and an orientation of the two-dimensional surface in the three-dimensional coordinate system. The position and orientation of a surfel can be defined by a corresponding set of coordinates. For example, a surfel can be defined by spatial coordinates, e.g., (x, y, z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g. a vector with a magnitude of 1, that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although all surfels in a surfel map can have the same size and shape. A surfel can have any appropriate shape. For example, a surfel can be a square, a rectangle, an ellipsoid, or a two-dimensional disc, to name just a few examples.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g. one or more labels describing the surface or object characterized by the surfel. As a particular example, if a surfel map represents a portion of a city block, then each surfel in the surfel map can have a semantic label identifying the object that is being partially characterized by the surfel, e.g. "streetlight," "stop sign," "mailbox," etc.

A surfel map can characterize a real-world environment, e.g. a particular portion of a city block in the real world, or a simulated environment, e.g. a virtual intersection that is used to simulate autonomous driving decisions to train one or more machine learning models. As a particular example, a surfel map characterizing a real-world environment can be generated using sensor data that has been captured by sensors operating in the real-world environment, e.g. sensors on-board a vehicle navigating through the environment. In some implementations, an environment can be partitioned into multiple three-dimensional volumes, e.g. a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real world, one or more systems on-board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 120 which every vehicle in the system 100 can access.

The vehicle 102 in FIG. 1 is illustrated as an automobile, but the on-board system 110 can be located on-board any appropriate vehicle type. The vehicle 102 can be a fully autonomous vehicle that determines and executes fully autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g. an object or another vehicle represented in a map. The on-board system 110 includes one or more sensor subsystems 105. The sensor subsystems 105 include a combination of components that receive reflections of electromagnetic radiation, e.g., LIDAR systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 105 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 105 classify one or more groups of raw sensor measurements as being measures of a respective object of a particular type, the sensor subsystems 105 can compile the raw sensor measurements into a set of sensor data 125, and send the data to an environment prediction system 130.

The on-board system 110 also includes an on-board map store 140 that stores map data 145 of the environment. The map data 145 can include a surfel map, a road graph, or both. The map data 145 can for example be generated by combining sensor data captured by multiple vehicles navigating through the real world.

Every vehicle in the system 100 can use the same version map data 145. In some cases, different vehicles in the system 100 can use different versions of the map data 145, e.g. when some vehicles have not yet obtained an updated version of the surfel map from the server system 120.

Each surfel in the map data 145 can have associated data that encodes multiple classes of semantic information for the surfel. For example, for each of the classes of semantic information, the map data 145 can have one or more labels characterizing a prediction for the surfel corresponding to the class, where each label has a corresponding probability. As a particular example, each surfel can have multiple labels, with associated probabilities, predicting the type of the object characterized by the surfel, e.g. "pole" with probability 0.8, "street sign" with probability 0.15, and "fire hydrant" with probability 0.05.

The environment prediction system 130 can receive the map data 145 and combine it with the sensor data 125 to generate an environment prediction 135. The environment prediction 135 includes data that characterizes a prediction for the current state of the environment, including predictions for an object or surface at one or more locations in the environment.

The sensor data 125 might show that the environment through which the vehicle 102 is navigating has changed. In some cases, the changes might be large and discontinuous, e.g., if a new building has been constructed or a road has been closed for construction since the last time the portion of the map data 145 corresponding to the environment has been updated. In some other cases, the changes might be small and continuous, e.g., if a bush grew by an inch or a leaning pole increased its tilt. In either case, the sensor data 125 can capture these changes to the world, and the environment prediction system 130 can use the sensor data to update the data characterizing the environment stored in the map data 145 to reflect these changes in the environment prediction 135.

For one or more objects represented in the map data 145, the environment prediction system 130 can use the sensor data 125 to determine a probability that the object is currently in the environment. In some implementations, the environment prediction system 130 can use a Bayesian model to generate the predictions of which objects are currently in the environment, where the data in the map data 145 is treated as a prior distribution for the state of the environment, and the sensor data 125 is an observation of the environment. The environment prediction system 130 can perform a Bayesian update to generate a posterior belief of the state of the environment, and include this posterior belief in the environment prediction 135. In some implementations, the sensor data 125 also has a probability distribution for each object detected by the sensor subsystem 105 describing a confidence that the object is in the environment at the corresponding location; in some other implementations, the sensor data 125 includes detected objects with no corresponding probability distribution.

For example, if the map data 145 includes a representation of a particular object, and the sensor data 125 includes a strong detection of the particular object in the same location in the environment, then the environment prediction 135 can include a prediction that the object is in the location with high probability, e.g. 0.95 or 0.99. If the map data 145 does not include the particular object, but the sensor data 125 includes a strong detection of the particular object in the environment, then the environment prediction 135 might include a weak prediction that the object is in the location indicated by the sensor data 125, e.g. predict that the object is at the location with probability of 0.5 or 0.6. If the map data 145 does include the particular object, but the sensor data 125 does not include a detection of the object at the corresponding location, or includes only a weak detection of the object, then the environment prediction 135 might include a prediction that has moderate uncertainty, e.g. assigning a 0.7 or 0.8 probability that the object is present.

That is, the environment prediction system 130 might assign more confidence to the correctness of the map data 145 than to the correctness of the sensor data 125. In some other implementations, the environment prediction system 130 might assign the same or more confidence to the correctness of the sensor data 125 than to the correctness of the map data 145. In either case, the environment prediction system 130 need not treat the sensor data 125 or the map data 145 as a ground-truth, but can rather associate uncertainty with both in order to combine them. Approaching each input in a probabilistic manner can generate a more reliable environment prediction 135, as the sensor data 125 might have errors, e.g. if the sensors in the sensor subsystems 105 are miscalibrated, and the map data 145 might have errors, e.g. if the state of the world has changed.

In some implementations, the environment prediction 135 can also include a prediction for each class of semantic information for each object in the environment. For example, the environment prediction system 130 can use a Bayesian model to update the associated data of each surfel in the map data 145 using the sensor data 125 in order to generate a prediction for each semantic class and for each object in the environment. For each particular object represented in the map data 145, the environment prediction system 130 can use the existing labels of semantic information of the surfels corresponding to the particular object as a prior distribution for the true labels for the particular object. The environment prediction system 130 can then update each prior using the sensor data 125 to generate posterior labels and associated probabilities for each class of semantic information for the particular object. In some such implementations, the sensor data 125 also has a probability distribution of labels for each semantic class for each object detected by the sensor subsystem 105; in some other such implementations, the sensor data 125 has a single label for each semantic class for each detected object.

Continuing the previous particular example, where a particular surfel characterizes a pole with probability 0.8, a street sign with probability 0.15, and fire hydrant with probability 0.05, if the sensor subsystems 105 detect a pole at the same location in the environment with high probability, then the Bayesian update performed by the environment prediction system 130 might generate new labels indicating that the object is a pole with probability 0.85, a street sign with probability 0.12, and fire hydrant with probability 0.03. The new labels and associated probabilities for the object are added to the environment prediction 135.

The environment prediction system 130 can provide the environment prediction 135 to a planning subsystem 150, which can use the environment prediction 135 to make autonomous driving decisions, e.g., generating a planned trajectory for the vehicle 102 through the environment.

The environment prediction system 130 can also provide the sensor data 125 to a sensor data store 160 located in the server system 120.

The server system 120 is typically hosted within a data center 124, which can be a distributed computing system having hundreds or thousands of computers in one or more locations.

The server system 120 includes the sensor data store 160 that stores sensor data generated by respective vehicles navigating through the real world. As each vehicle captures new sensor data characterizing locations in the real world, each vehicle can provide the sensor data to the server system 120. The server system 120 can then use the sensor data to update the map data used by vehicles in the system 100. That is, when sensor data collected by a particular vehicle indicates that the real world has changed in some way, e.g. a new lane has been added to a roadway, the server system 120 can update the map data so that the rest of the vehicles in the system 100 can be informed of the change.

The server system 120 also includes a map store 180 that can maintain a current version of the surfel map and the road graph.

A surfel map updating system 170, also hosted in the server system 120, can generate updated surfel map data 175, e.g., using new sensor measurements collected by vehicles.

The surfel map updating system 170 can receive new sensor data 185, which the surfel map updating system 170 can use to generate an updated surfel map. In some examples, the surfel map updating system 170 can receive the new sensor data 185 from the sensor data store 160.

In many situations, the updated surfel map can have substantial differences with an old surfel map. This can be because the environment has actually changed. For example, new observational data can indicate that a building is further west than was previously represented in the map. The new surfel data will thus include data representing the new position of the building.

Differences in surfel maps can also arise due to processing pipeline changes. For example, the system can deploy more-sophisticated sensor processing algorithms, which can result in more accurate and more precise environmental representations.

For example, a new imagery algorithm can generate new surfel data based on observational data, e.g., vehicle sensor data, satellite image data, land survey data, or any combination of these.

The imagery algorithm can occasionally or periodically be updated to improve these computational methods. A new or updated imagery algorithm can then generate new surfel data due to combining the observational data in a new way. In another example, the imagery algorithm can include computational methods for merging imagery data for maps of multiple environments into a combined map. The updated imagery algorithm can then generate new surfel data due to merging the imagery data for the maps of the multiple environments in a new way.

In some implementations, the surfel map updating system 170 updates the surfel map data at regular time intervals, e.g. once per hour or once per day, obtaining a batch of all of the new sensor data 185 that has been added to the sensor data store 160 or generated by another source since the last update. In some implementations, the surfel map updating system 170 can update the surfel map data whenever a new sensor data 185 is received by the sensor data store 160 or whenever the new sensor data is available.

After generating the updated surfel map data 175, the surfel map updating system 170 can store the updated surfel map data 175 in the map store 180, replacing the stale map. Additionally, after generating the updated surfel map data 175, the surfel map updating system 170 can provide the updated surfel map data 175 to the road graph updating system 190. The road graph updating system 190 can update road graphs based on the updated surfel map data 175. The road graph updating system 190 can generate updated road graph data 165. After generating the updated road graph data 165, the road graph updating system 190 can store the updated road graph data 165 in the map store 180.

The map store 180 can store the updated surfel map data 175 and the updated road graph data 165. Each vehicle in the system 100 can then obtain updated map data 195 from the server system 120, e.g., through a wired or wireless connection, replacing the stale version with the retrieved updated map data 195 in the on-board map store 140. The updated map data 195 can include the updated surfel map data 175, the updated road graph data 165, or both. In some implementations, each vehicle in the system 100 retrieves updated map data 195 whenever the map is updated and the vehicle is connected to the server system 120 through a wired or wireless connection. In some other implementations, each vehicle in the system 100 retrieves the most recent updated map data 195 at regular time intervals, e.g. once per day or once per hour.

Figure 2A:
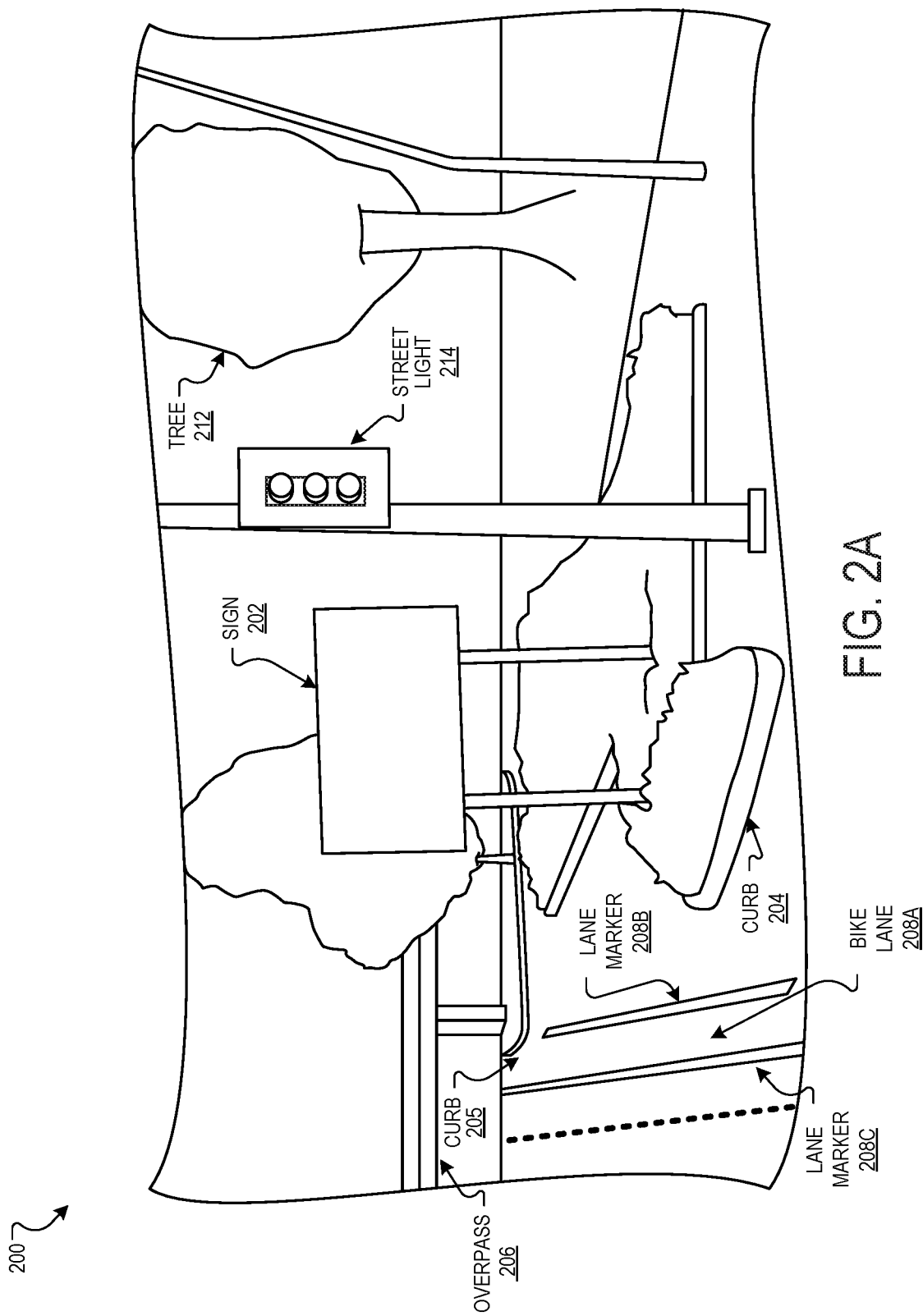
FIG. 2A is an illustration of an example environment.
Figure 2B:
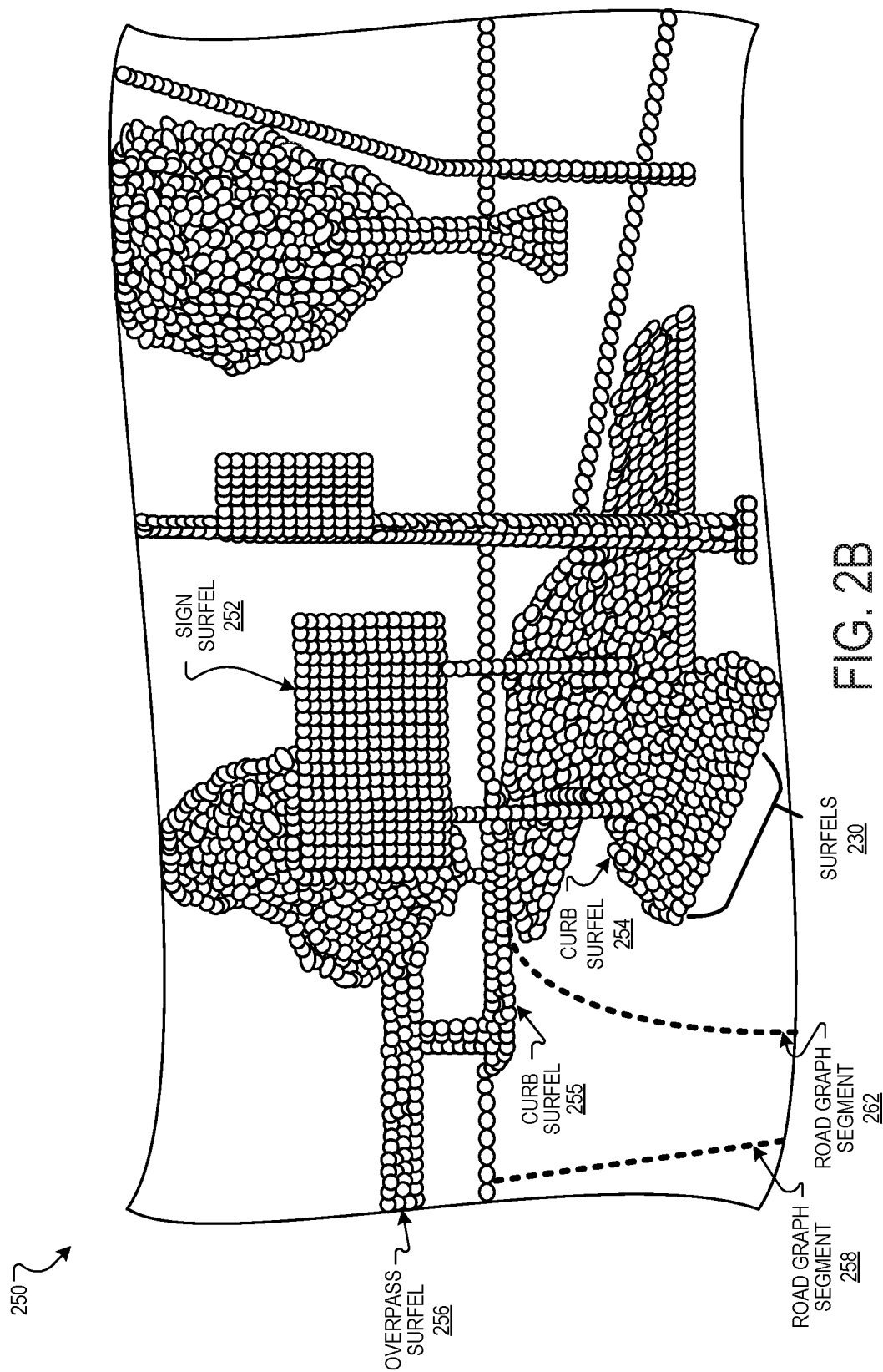
FIG. 2B is an illustration of an example map of the environment of FIG. 2A.

FIG. 2A is an illustration of an example environment 200. The environment 200 is depicted from the point of view of a sensor, e.g., a camera, on-board a vehicle navigating through the environment 200. The environment 200 includes several features including a sign 202, curbs 204, 205, an overpass 206, a tree 212, and a street light 214. The environment 200 also includes a bike lane 208A, a lane marker 208B that defines an outside boundary oft the bike lane 208A, and a lane marker 208C that marks a boundary between a vehicle roadway and the bike lane 208A FIG. 2B is an illustration of an example surfel map 250 of the environment 200 of FIG. 2A. The surfel map 250 includes surfels 230.

FIG. 2B also superimposes a road graph segments 258 and 262 onto the surfel map. Typically the road graph would be maintained in a separate data structure or subsystem, but for ease of illustration, the road graph and the surfel map are presented together in FIG. 2B.

Each surfel in the example surfel map 250 is represented by a disk, and defined by three coordinates (latitude, longitude, altitude), that identify a position of the surfel in a common coordinate system of the environment 200. Each surfel also has a respective orientation, which can be represented as a normal vector emanating from the center of the surfel. For example, each surfel can be defined to be a disk that extends some radius, e.g. 1, 10, 25, or 100 centimeters, around coordinates (latitude, longitude, altitude) for a particular voxel in a voxel volume for the environment 200. In some other implementations, the surfels can be represented as other two-dimensional shapes, e.g. ellipsoids or squares, to name just a few examples.

The environment 200 is partitioned into a volume of equal-sized voxels. Each voxel in the volume of the environment 200 can contain at most one surfel, where, e.g., the (latitude, longitude, altitude) coordinates of each surfel defines the voxel that the surfel occupies. Many voxels will lack surfels, for example, if they do not overlap with any objects in the environment. That is, if there is a surface of an object at the location in the environment corresponding to a voxel, then there can be a surfel representing the surface; if there is not a surface of an object at the location, then the voxel does not have an associated surfel. In some other implementations, a single map can contain surfels of various different sizes that are not organized within a fixed spatial grid.

Each surfel in the map 250 has associated data characterizing semantic information for the surfel. For example, as discussed above, for each of multiple classes of semantic information, the map can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "permanent" label might have a high probability for surfels characterizing vegetation. Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicting that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

Note that, for any latitude and longitude in the environment 200, i.e. for any given (latitude, longitude) position in a plane running parallel to the ground of the environment 200, the surfel map 250 can include multiple different surfels each corresponding to a different altitude in the environment 200, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 206 in the environment 200 and the curb 205 underneath the overpass 206. The surfel map 250, on the other hand, is able to represent both the overpass 206 and the curb 205 underneath the overpass 206, e.g. with an overpass surfel 256 and a curb surfel 255 that have the same latitude coordinate and longitude coordinate but a different altitude coordinate.

The road graph represents permissible paths of travel for the vehicle in the environment. In this example, the road graph includes multiple portions, e.g., a road graph segment 258 and a road graph segment 262. The road graph segment 258 represents the center of the road bordered by road edge 208, and the road graph segment 262 represents the center of a turn lane.

A road portion or segment can be, for example, a line segment within a road graph that represents a length of a component of a roadway. The road graph can include a graph network of information such as roads, lanes, intersections, and the connections between these components. Each component can be stored as graph data and can be associated with information such as a geographic location and whether or not the component is linked to related components or to surfels representing features of the environment. For example, a stop light can be linked to a road and an intersection, etc. In some examples, the associated data can include grid-based indices of a road graph to allow for efficient lookup of certain road graph features.

In some implementations, each portion of the road graph is mapped to one or more surfels 230. For example, each segment of the road graph can be mapped to one or more surfels corresponding to a particular feature that is near or associated with the road graph segment. For example, a curb surfel 254 can be mapped or referenced to a particular road graph segment, e.g., the road graph segment 262, that has a same or similar latitude and longitude coordinate. Thus, if the curb surfel 254 is adjusted to a new coordinate position (e.g., latitude and longitude), the corresponding road graph segment 262 will also adjust to the new coordinate position.

In some examples, the road graph can be mapped independently of the surfels 230. For example, each road graph segment can be mapped to a particular latitude, longitude, and elevation that is independent of any surfels 230.

Figure 3:
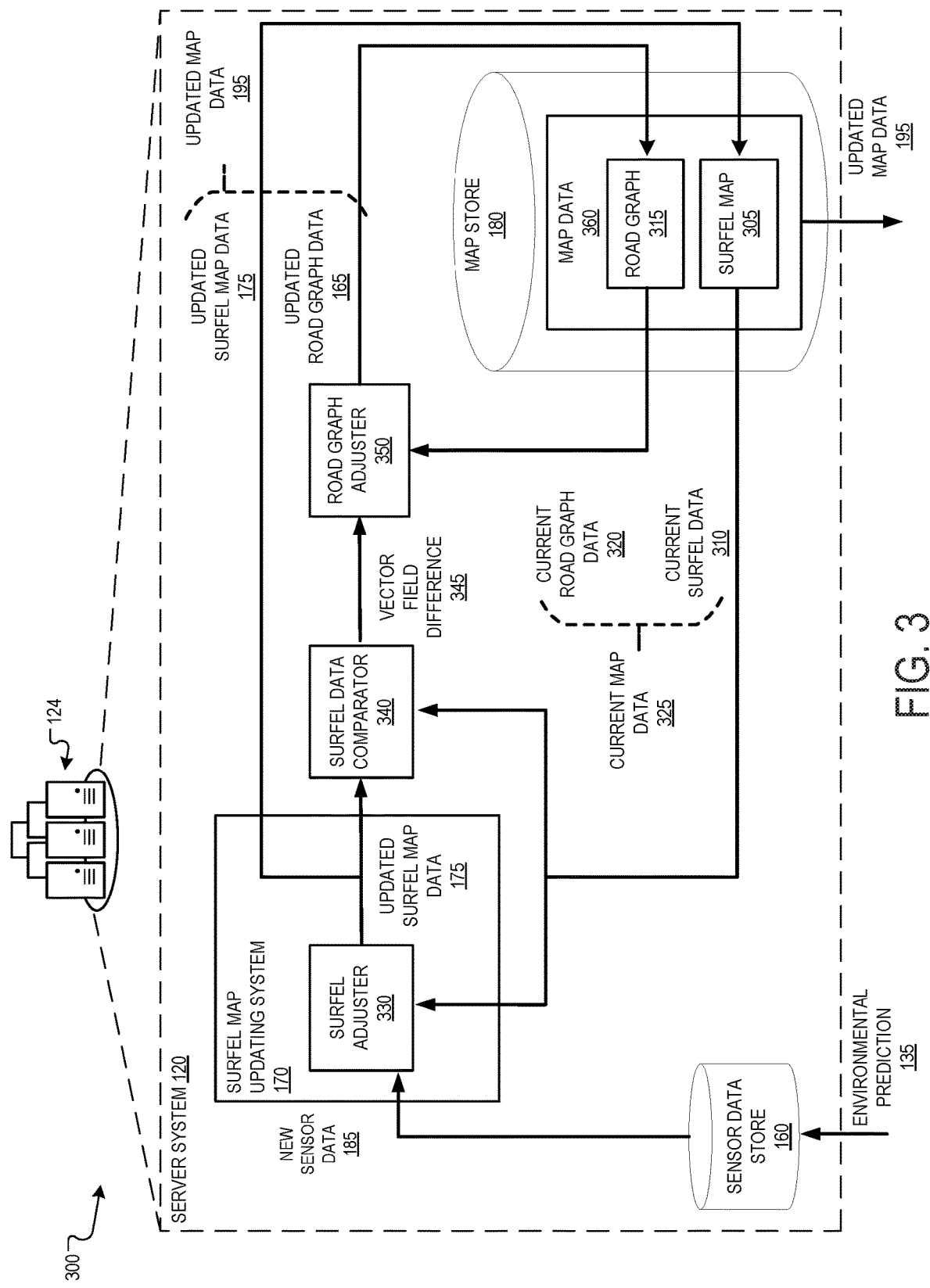
FIG. 3 is a diagram of an example system for updating surfel data of the map.

FIG. 3 is a diagram of an example system 300 for updating a road graph based on updated surfel data. The system 300 can be for example a subset of the system 100. For example, the system 300 can include the server system 120 hosted within the data center 124. The system 300 can also include the sensor data store 160, the surfel map updating system 170, which includes a surfel adjuster 330, a road graph updating system 190, which may include a surfel data comparator 340 and a road graph adjuster 350, and the map store 180.

The map store 180 stores map data 360. The map data 360 can include a road graph 315 and a surfel map 305. The surfel adjuster 330, surfel data comparator 340, and road graph adjuster 350 can each be provided as one or more computer executable software modules or hardware modules. That is, some or all of the functions of surfel adjuster 330, surfel data comparator 340, and road graph adjuster 350 can be provided as a block of computer code, which upon execution by a processor, causes the processor to perform functions described below. Some or all of the functions of surfel adjuster 330, surfel data comparator 340, and road graph adjuster 350 can be implemented in electronic circuitry, e.g., by individual computer systems (e.g., servers), processors, microcontrollers, a field programmable gate array (FPGA), or an application specific integrated circuit (ASIC).

Figure 6:
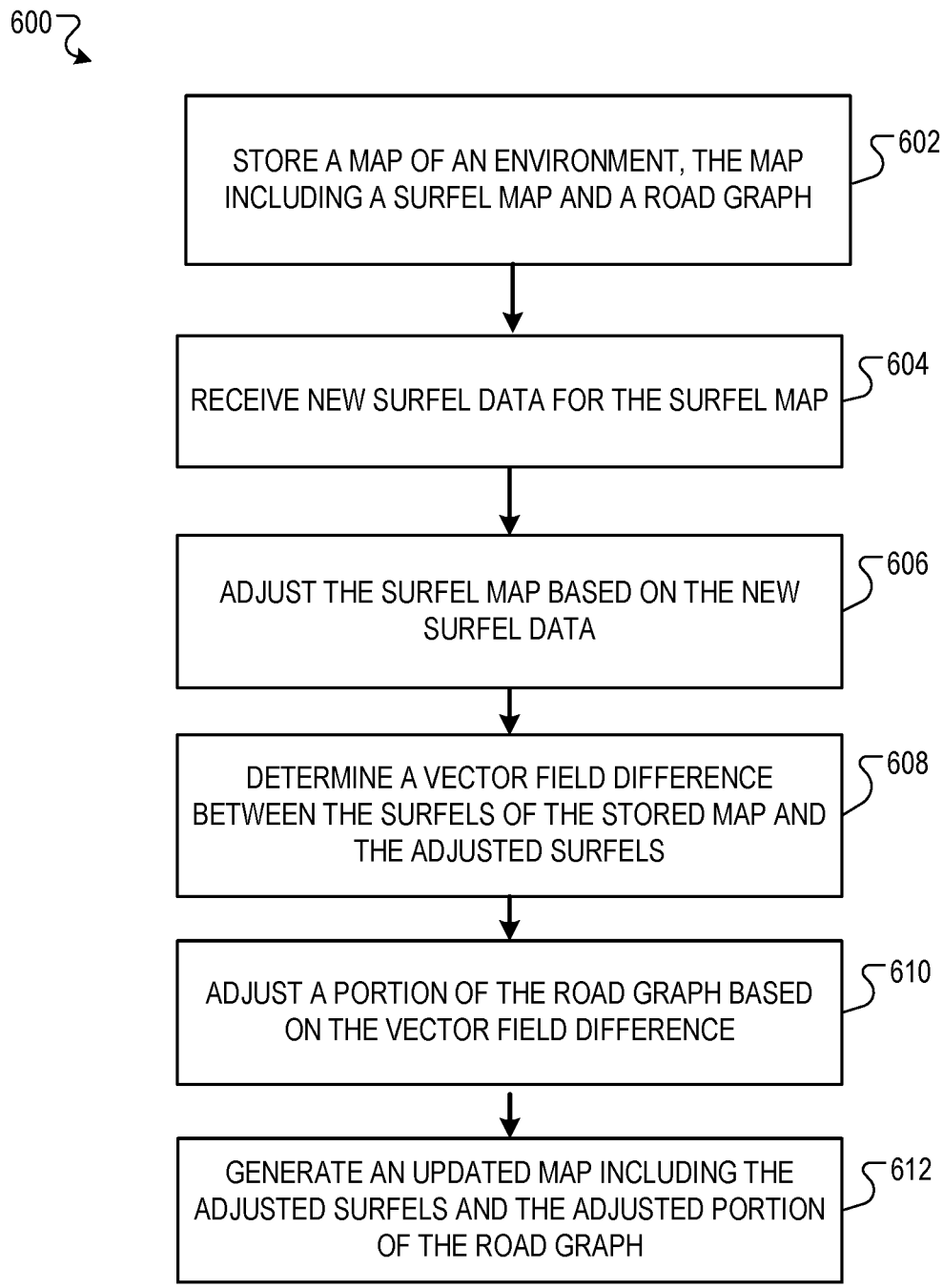
FIG. 6 is a flow diagram of an example process for updating a map of an environment.

Referring to FIG. 6, an example process 600 for updating a map of an environment includes storing a map of an environment, the map including surfels and a road graph (602).

For convenience, the process 600 will be described as being performed by a system of one or more computers located in one or more locations. For example, the surfel map updating system 170, the surfel data comparator 340, and the road graph adjuster 350 depicted in FIG. 3, appropriately programmed in accordance with this specification, can perform the process 600.

The surfel map updating system 170 of the system 300 can perform the process 600 to update map data 360 of an environment.

Figure 4A:
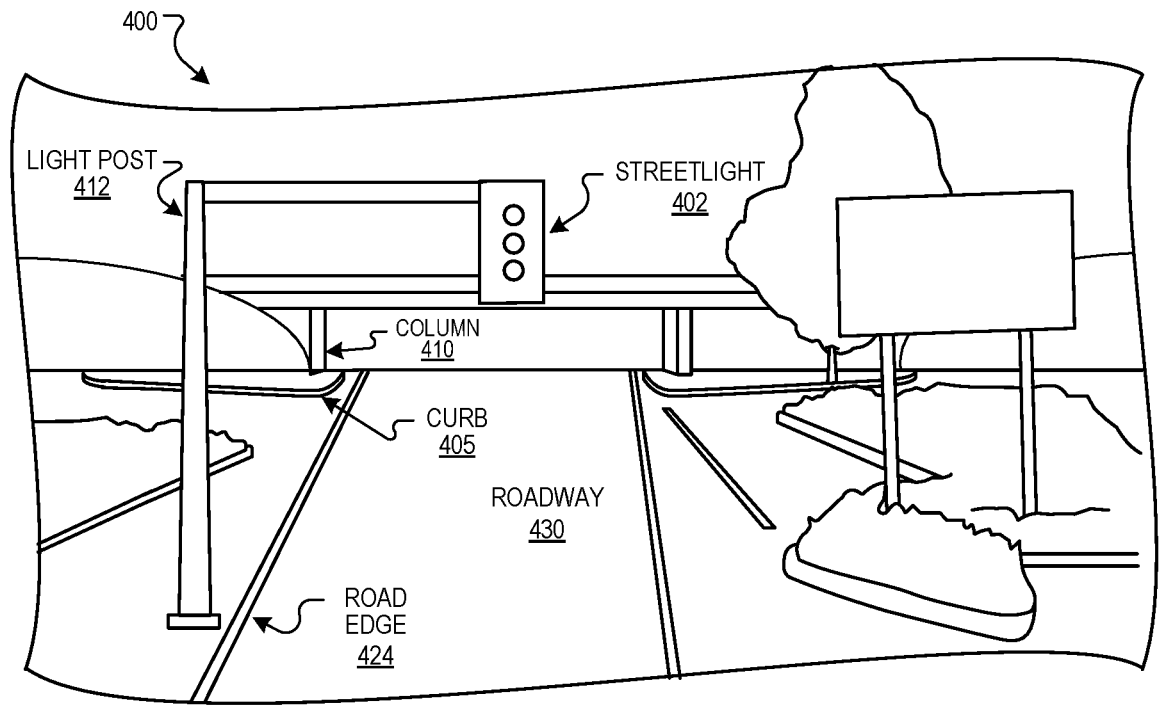
FIGS. 4A to 4F illustrate example maps used in a process for updating surfel data.

FIG. 4A illustrates an example environment 400. The environment 400 includes portions of a roadway 430 and a road edge 424 that can be explicitly or implicitly represented in the road graph. The environment 400 includes features including a streetlight 402, a light post 412, and a column 410. The light post 412 and the column 410 are outside of the road edge 424.

The map store 180 stores the map data 360 of the environment 400. The map data 360 can include the surfel map 305 representing surfaces of the features, and the road graph 315 representing vehicle travel routes.

The process 600 includes receiving new surfel data for the surfel map (604). The new surfel data can be generated from new sensor data 185, e.g., new imagery, new detections, or both.

The updated surfel map data 175 can include data representing modified shapes, sizes, locations, or orientations of features of the environment.

The process 600 includes adjusting the surfel map based on the new surfel data (606). The surfel adjuster 330 receives the new sensor data 185. The surfel adjuster 330 can also receive current surfel data 310. The surfel adjuster 330 can adjust the surfels in the surfel map based on the new sensor data 185. For example, the new sensor data 185 can indicate a new shape of a particular feature. The surfel adjuster 330 can identify the surfels of the current surfel data 310 that correspond to the location of the changed feature. The surfel adjuster 330 can then adjust the surfels in the surfel map to reflect the new shape.

Figure 4B:
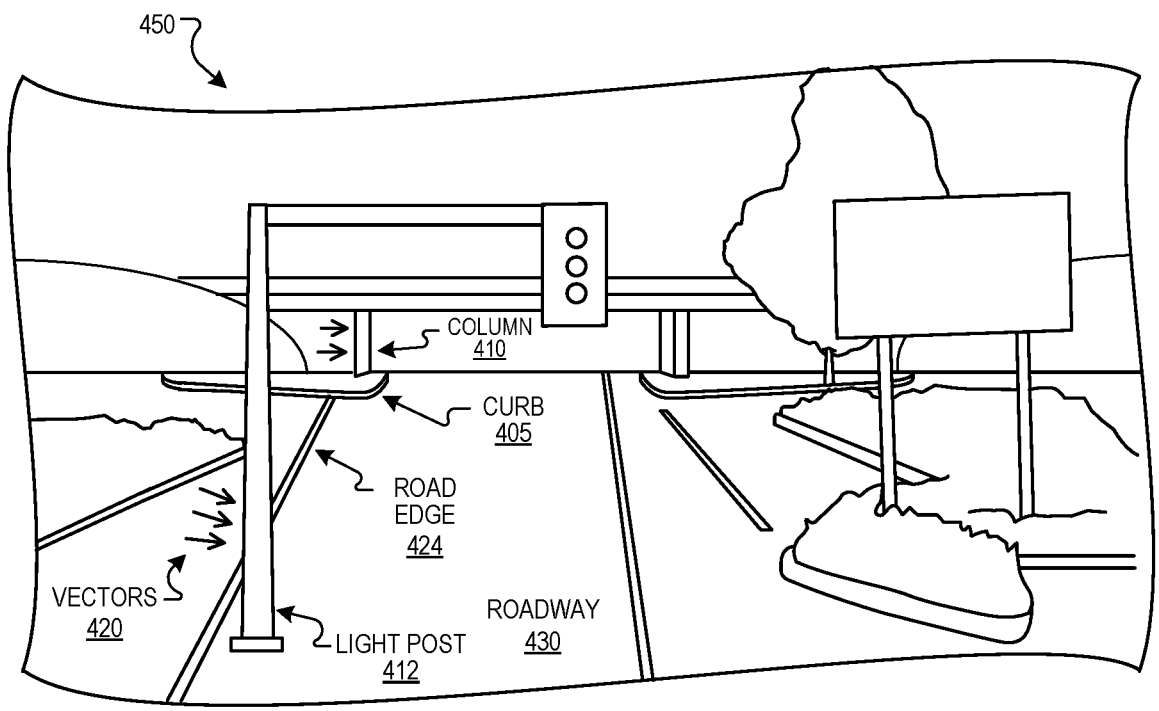

For example, FIG. 4B shows an example modified environment 450 that represents the environment 400 with new sensor data 185. In this example, construction has been completed that narrows the roadway and readjusts several features in the environment.

The new sensor data 185 thus indicates new positions of several features of the modified environment 450 compared to the environment 400. Specifically, the light post 412 and the column 410 have new positions in the modified environment 450 that are further to the right e.g., inward toward the center of the roadway 430, than in the environment 400. A shift, or change in position, of the features are represented by example vectors 420.

Though some of the features of the modified environment 450 have new positions based on the new sensor data 185, the original road graph of the modified environment 450 remains in the original positions of the environment 400. Specifically, the road edge 424 as represented by the road graph itself would be in the same respective positions in the modified environment 450 as in the environment 400. Note that as discussed above, a road graph can represent the center of a path of travel, the edges of a path of travel, or both. For simplicity, the following examples assume that the road graph explicitly represents the road edge 424 and other road edges in the example environment. However, the same techniques can also be used for road graphs that represent the centers of the paths of travel.

Because the features of the modified environment 450 have new positions, while the road graph of the modified environment 450 remains in its original positions, the road graph of the modified environment 450 does not align with the features. For example, the light post 412 is no longer outside of the road edge 424 as it is represented in the road graph, but appears to be in the roadway 430. Similarly, the column 410 is no longer outside of the road edge 424 as represented in the road graph, but also appears to be in the roadway 430.

Figure 4D:
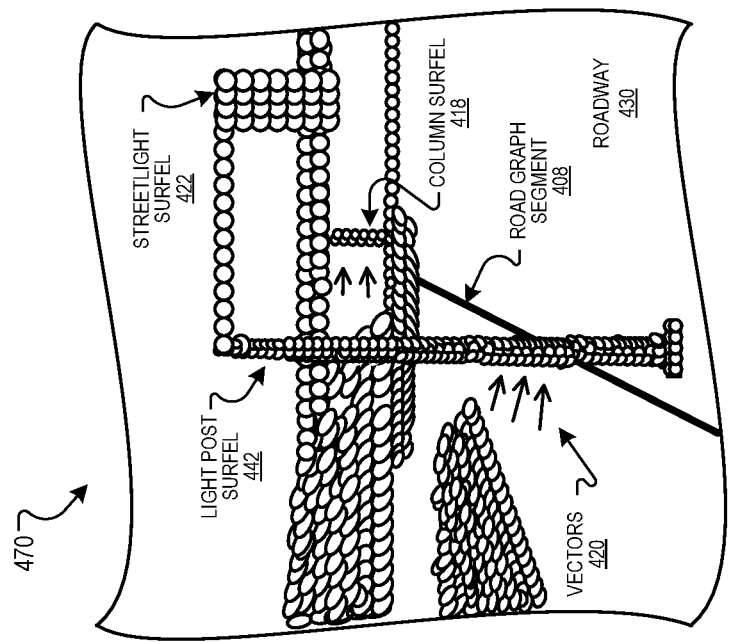
Figure 4C:
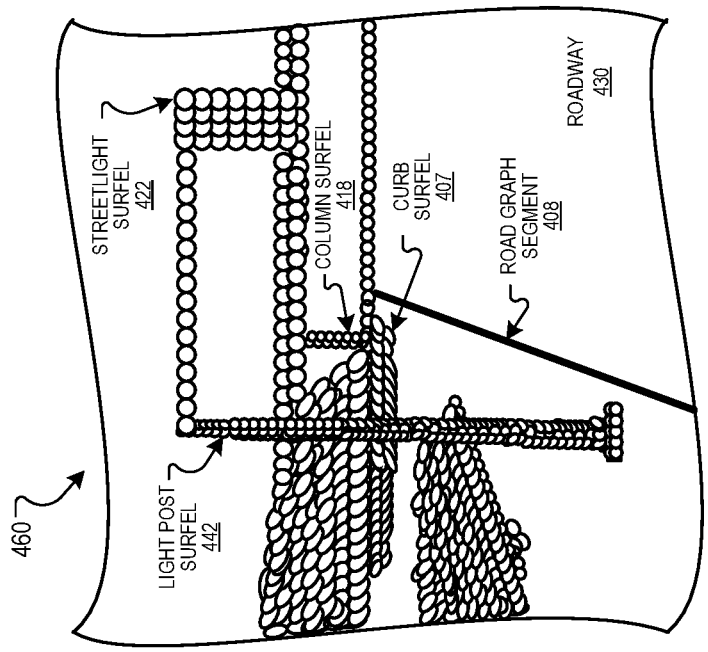

FIG. 4C is an illustration of an original surfel map 460 of a portion of the environment 400. FIG. 4D is an illustration of a modified surfel map 470 of a portion of the environment 450.

The original surfel map 460 includes current map data 325. The current map data 325 includes current surfel data 310 and current road graph data 320.

The current surfel data 310 of original surfel map 460 includes surfel data for a curb surfel 407 that characterizes a portion of the curb 405. The current surfel data 310 of the original surfel map 460 also includes surfel data for a streetlight surfel 422 that characterizes a portion of the streetlight 402, a light post surfel 442 that characterizes a portion of the light post 412, and a column surfel 418 that characterizes a portion of the column 410.

The current road graph data 320 of original surfel map 460 can include a position, orientation, elevation, and length of the road graph segment 408.

The surfel adjuster 330 modifies the current surfel data 310 based on the new sensor data 185. For example, the surfel adjuster 330 can modify the coordinate location, orientation, or other characteristics of each surfel of the original surfel map 460 based on the new imagery data.

The surfel adjuster 330 outputs updated surfel map data 175. The updated surfel map data 175 includes updated characteristics of each surfel for which the surfel adjuster received new sensor data 185.

The modified surfel map 470 shows the original surfel map 460 with updated surfel map data 175. As a result of adjusting the surfels based on the new sensor data 185, surfels in the modified surfel map 470 are in different respective locations than in the original surfel map 460.

Specifically, the light post surfel 442 and the column surfel 418 have new positions in the modified surfel map 470 that are further to the right, e.g., inward towards the center of the roadway 430, than in the original surfel map 460. However, the road graph components of the modified surfel map 470 remain in the original positions. For example, the road graph segment 408 is in the same respective positions in the modified surfel map 470 as in the original surfel map 460.

The process 600 includes determining a vector field difference between the surfels of the stored map and the adjusted surfels (608).

The surfel data comparator 340 receives adjusted surfels, e.g., the updated surfel map data 175, from the surfel adjuster 330. The surfel data comparator 340 also receives surfels, e.g., the current surfel data 310, from the map store 180. The surfel data comparator 340 compares the updated surfel map data 175 to the current surfel data 310 to determine a vector field difference 345.

In some examples, the surfel data comparator 340 can compare all characteristics of the updated surfel map data 175 and the current surfel data 310. For example, each surfel can include data related to characteristics of latitude, longitude, elevation, orientation, color, category, permanence, etc. The surfel data comparator 340 can compare the updated surfel map data 175 and the current surfel data 310 with respect to each of these characteristics.

In some examples, the surfel data comparator 340 can compare some, but not all, characteristics of the updated surfel map data 175 and the current surfel data 310. For example, the surfel data comparator 340 can compare only those characteristics of each surfel related to location (e.g., latitude, longitude, and. elevation). In another example, the surfel data comparator 340 can compare only those characteristics of each surfel related to location and orientation (e.g., pitch, yaw, roll)

The surfel data comparator 340 outputs a difference between the updated surfel map data 175 and the current surfel data 310. The difference can be, for example, the vector field difference 345. The vector field difference can include vectors, e.g., 420, that represent movement of surfels between the current surfel data 310 and the updated surfel map data 175.

In some examples, each vector of the vector field difference 345 can represent a magnitude and direction of movement of a particular surfel. For example, each vector of the vector field difference 345 can have an origin point at a coordinate location corresponding to an original position of the surfel, e.g., the position of the surfel in the original surfel map 460. Each vector of the vector field difference 345 can have a terminal point at a coordinate location corresponding to a final position of the surfel, e.g., the position of the surfel in the modified surfel map 470.

In some examples, each vector of the vector field difference 345 can represent a magnitude and direction of movement of a number of surfels between the original surfel map 460 and the modified surfel map 470. The vector field difference 345 can include vectors generated using statistical analysis of surfel movement.

In some examples, each voxel of the modified surfel map 470 can include a vector of the vector field difference 345. The vector of each voxel can represent movement of all of the surfels within the voxel. For example, the vector of each voxel can represent an average magnitude, direction, and orientation of movement of the surfels within the voxel.

In some examples, the vector field difference can include data representing movement in additional dimensions or degrees of freedom. For example, the vector field difference can include data representing changes of orientation of the surfels between the original surfel map 460 and the modified surfel map 470.

The process 600 includes adjusting a portion of the road graph based on the vector field difference (610). The road graph adjuster 350 receives the vector field difference 345 from the surfel data comparator 340. The road graph adjuster 350 also receives the road graph, e.g., the current road graph data 320, from the map store 180. The road graph adjuster 350 adjusts the road graph based on the vector field difference 345 of one or more surfels.

Figure 4F:
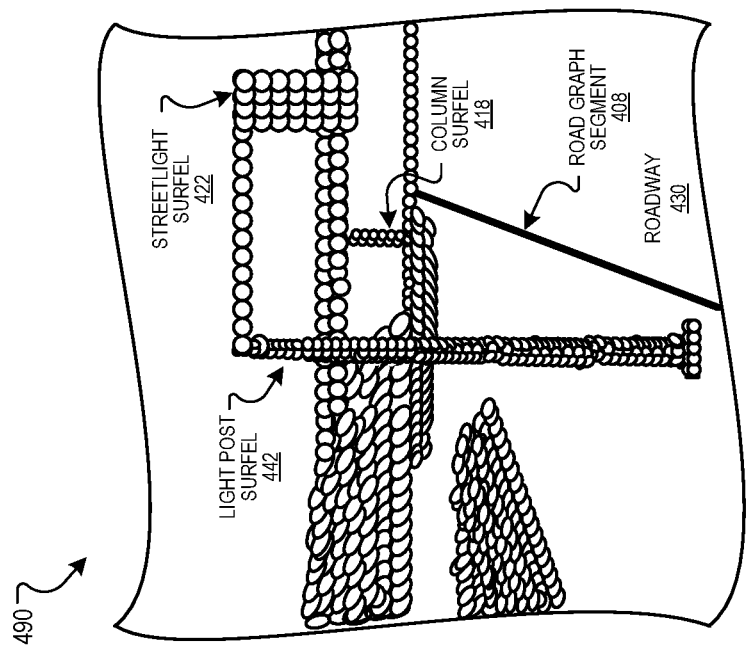
Figure 4E:
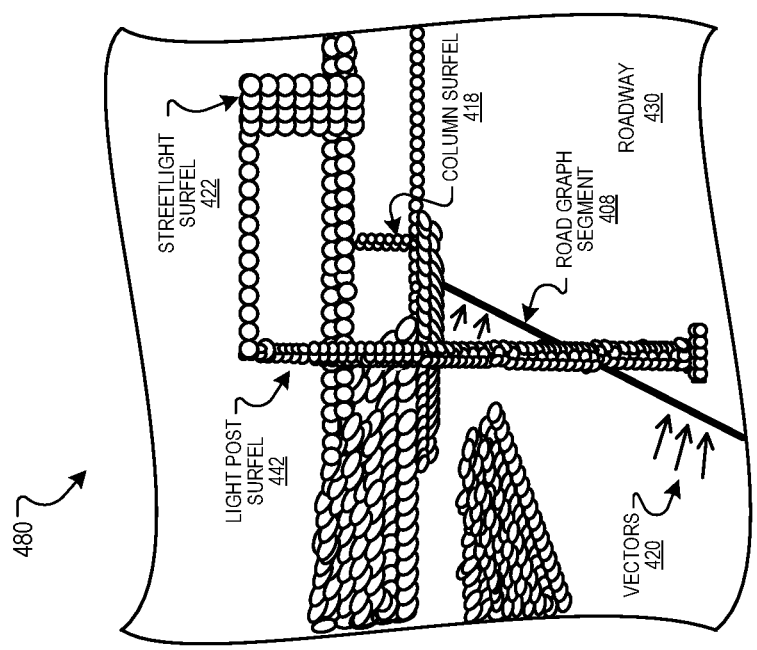

For example, FIG. 4E shows an illustration of an example unadjusted surfel map 490 prior to adjustment by the road graph adjuster 350. FIG. 4F shows an illustration of an example adjusted surfel map 490 after adjustment by the road graph adjuster 350.

The unadjusted surfel map 490 is similar to the modified surfel map 470. The unadjusted surfel map 490 includes the updated surfel map data 175 and the current road graph data 320. Thus, the surfels, e.g., the light post surfels 442 and the column surfels 418 are misaligned with the road graph, e.g., the road graph segment 408.

The road graph adjuster 350 applies the vector field difference 345 to the current road graph data 320. For example, the road graph adjuster 350 can apply the vector field difference 345 to the road graph segment 408. By applying the vector field difference 345 to the road graph data 320, the road graph adjuster 350 can align the features of the unadjusted surfel map 490 with the road graph of the unadjusted surfel map 490.

In some examples, each road graph portion or segment can be mapped to one or more surfels. For example, each road graph can be mapped to a surfel corresponding to a particular feature that is near or associated with the road graph. In these examples, the road graph adjuster 350 can apply the vector field difference 345 to the portion of the road graph based on a vector representing movement of the surfel to which the portion of the road graph is mapped.

For example, the light post 412 of FIG. 4A is positioned near the road edge 424 and outside of the road edge 424. Thus, the road graph segment 408 can be mapped to the light post surfels 442. If the position or orientation of the light post 412 changes, the road graph segment 408. In this example, the road graph adjuster 350 can apply vectors 444 to the road graph segment 408 based on the vectors that represent movement of the light post surfel 442. The road graph segment 408 can then move in the same direction, magnitude, and/or orientation as the light post surfel 442.

In some examples, the road graph adjuster 350 can apply a vector to a portion of a road graph based on the proximity of the portion of the road graph to a surfel. For example, the road graph adjuster 350 can apply a vector to each road graph segment that is within a threshold proximity to a particular surfel. For example, the column surfel 418 is positioned near the road graph segment 408 and outside of the road graph segment 408. The road graph adjuster 350 can determine that the road graph segment 408 is within the threshold proximity to the column surfel 418. The road graph adjuster 350 can therefore apply a vector to the road graph segment 408 based on movement of the column surfel 418. The road graph segment 408 can move a same direction and magnitude as the column surfel 418. In some examples, the road graph adjuster 350 can adjust the portion of the road graph based on an average vector field difference of one or more surfels within a threshold proximity to the portion of the road graph.

In some examples, the road graph adjuster 350 can apply a vector to the portion of the road graph based on the movement vector of the nearest surfel. In some examples, the road graph adjuster 350 can adjust the portion of the road graph based on a surfel having at least one shared positional coordinate with the portion of the road graph. For example, the road graph adjuster 350 can apply a vector to a portion of the road graph based on movement of one or more surfels that have a same or similar latitude and longitude as the portion of the road graph. As an example, a light post surfel 442 and a portion of the road graph can have the same latitude and longitude, but can have a different elevation. Thus, the road graph adjuster 350 can apply a vector to the portion of the road graph based on the movement of the light post surfel 442.

The process 600 includes generating an updated map including the adjusted surfels and the adjusted portion of the road graph (612). The road graph adjuster 350 outputs updated road graph data 165. The updated road graph data 165 can be added to the updated surfel map data 175 from the surfel adjuster 330. The updated surfel map data 175 and the updated road graph data 165 combine to make an updated map, e.g., updated surfel map data 175. The updated surfel map data 175 is stored in the map store 180 as the map data 360.

FIG. 4F shows an example adjusted surfel map 490 including updated surfel map data 175. The updated map data includes the updated road graph data 165 and the updated surfel map data 175. The features and the road graph of the adjusted surfel map 490 are realigned, compared to the unadjusted surfel map 490. For example, the road graph segment 408 is positioned inside of the light post surfels 442 and the column surfels 418, similar to the relative positions of the road graph segment 408 to the light post surfel 442 and the column surfel 418 of the original surfel map 460.

In some implementations, the surfel map updating system 170 updates the map data 360 at regular time intervals, e.g. once per hour or once per day. In these examples, the surfel map updating system 170 can obtain a batch of all of the new sensor data 185 that has been added to the sensor data store 160, or that has been produced by the imagery algorithm 164, since the last update. In some other implementations, the surfel map updating system 170 updates the map whenever a new sensor data 125 is received by the sensor data store 160.

An overhead view of an example implementation of the process for updating map data is shown in FIGS. 5A to 5D.

Figure 5A:
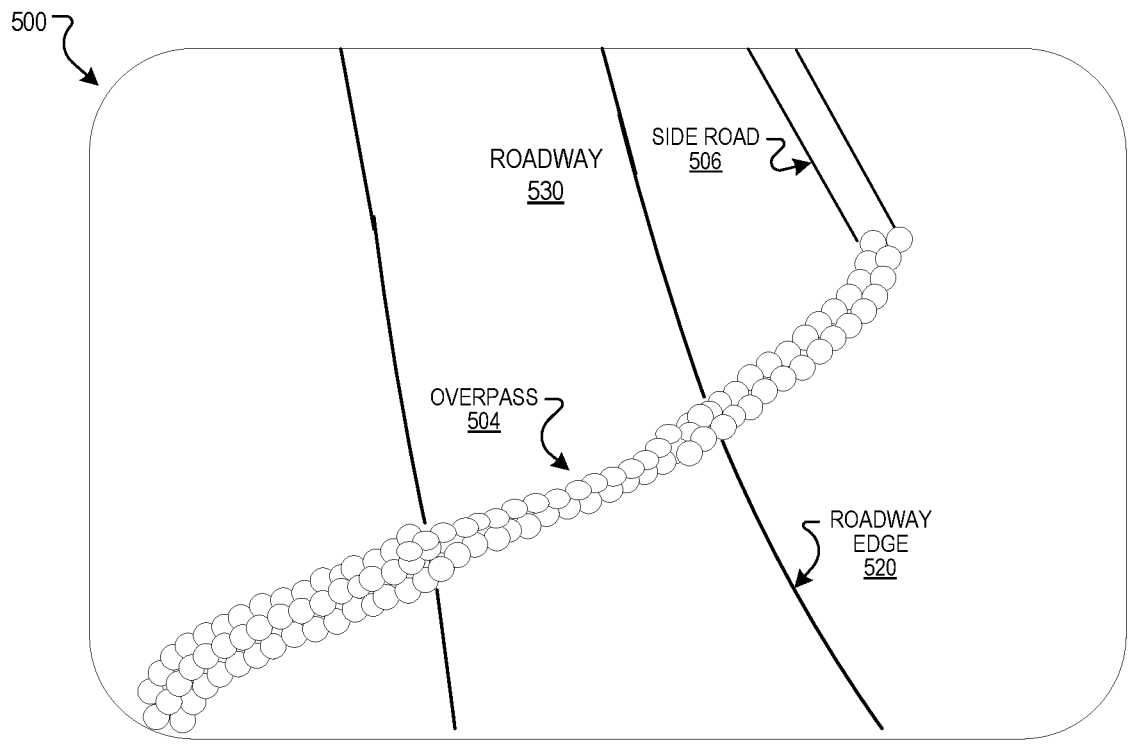
FIGS. 5A to 5D illustrate an overhead view of example maps used in a process for updating surfel data.

An example overhead view of a map 500 is shown in FIG. 5A. The map 500 includes a roadway 530 with a roadway edge 520, an overpass 504, and a side road 506 connecting to the overpass. In the example map 500, the roadway 530 and the side road 506 can be represented as components of a road graph. The overpass 504 can be represented by surfels.

Figure 5B:
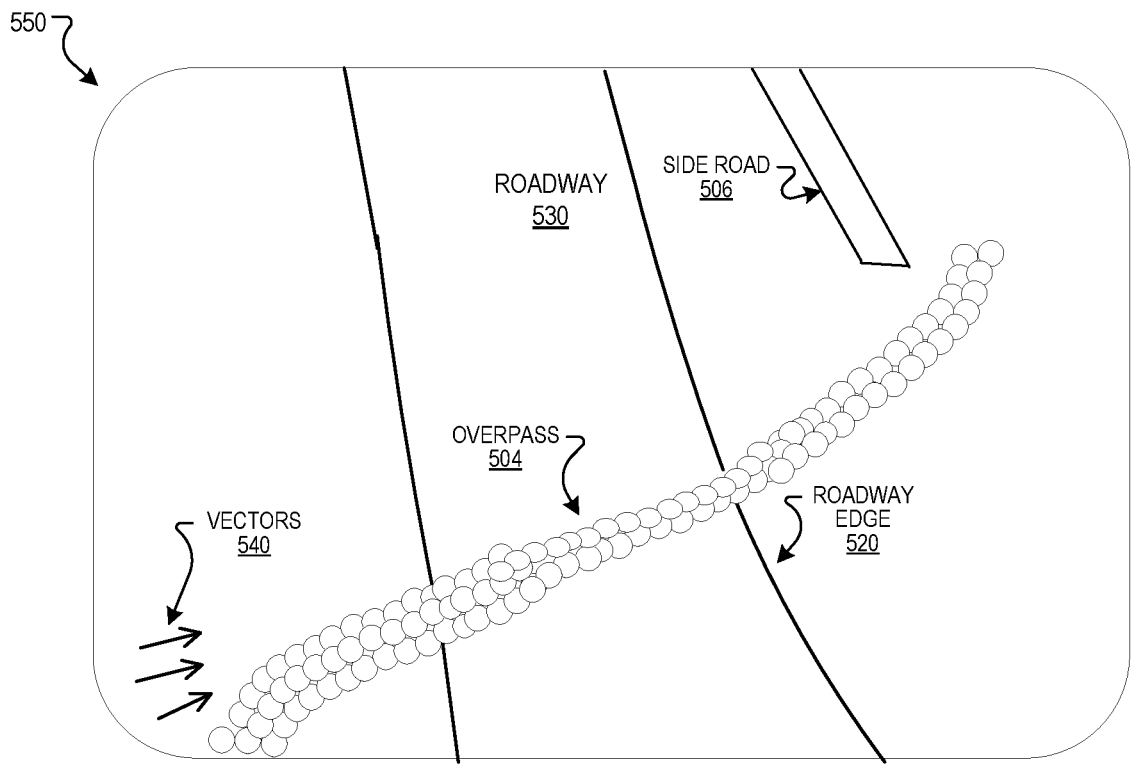

FIG. 5B shows an example modified map 550 that represents the map 500 with new sensor data 185. The new sensor data 185 includes new positions of surfels of the modified map 550 compared to the map 500. Specifically, as a result of incorporating new surfel data, the overpass 504 has a new position in the modified map 550 that is further to the right than in the map 500. A change in position of the overpass 504 is represented by example vectors 540.

Though the surfels of the modified map 550 have new positions based on the new sensor data 185, the components of the road graph of the modified map 550 remain in the original positions of the map 500. Specifically, the roadway edge 520 and the side road 506 are in the same respective position in the modified map 550 as in the map 500.

Because the surfels of the modified map 550 have new positions, while the road graph of the modified map 550 remains in its original position, the surfels of the modified map 550 do not align with the road graph. For example, the side road 506 no longer connects to the overpass 504.

Figure 5C:
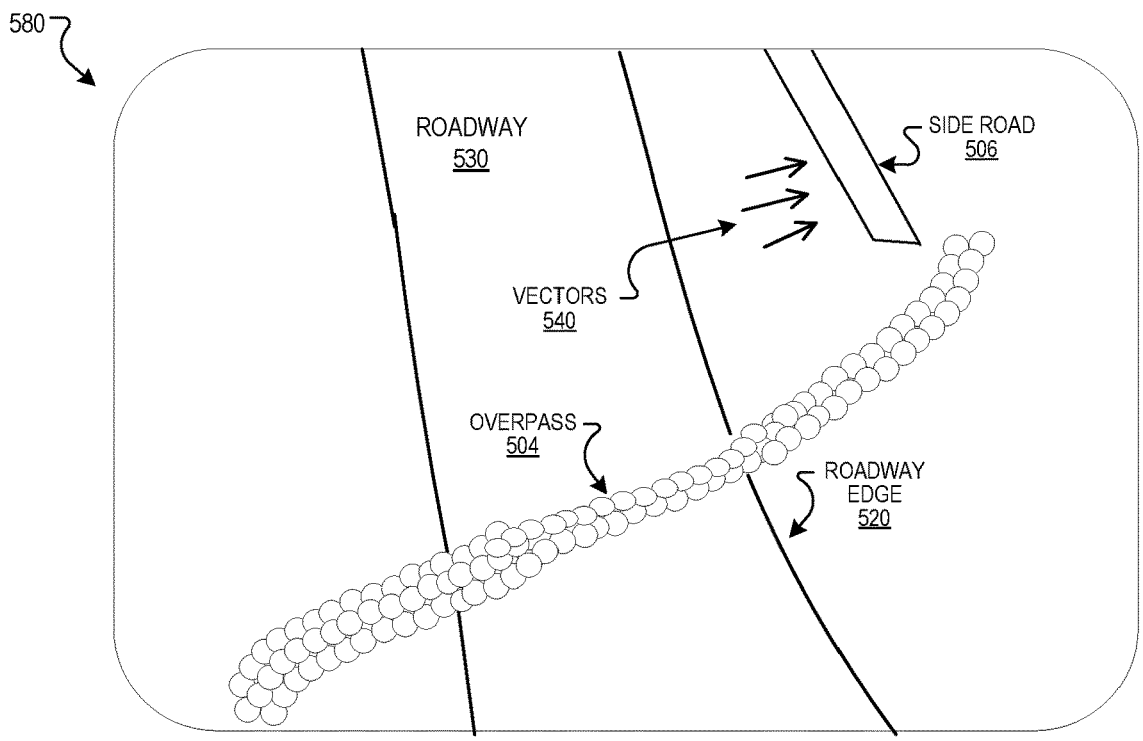
Figure 5D:
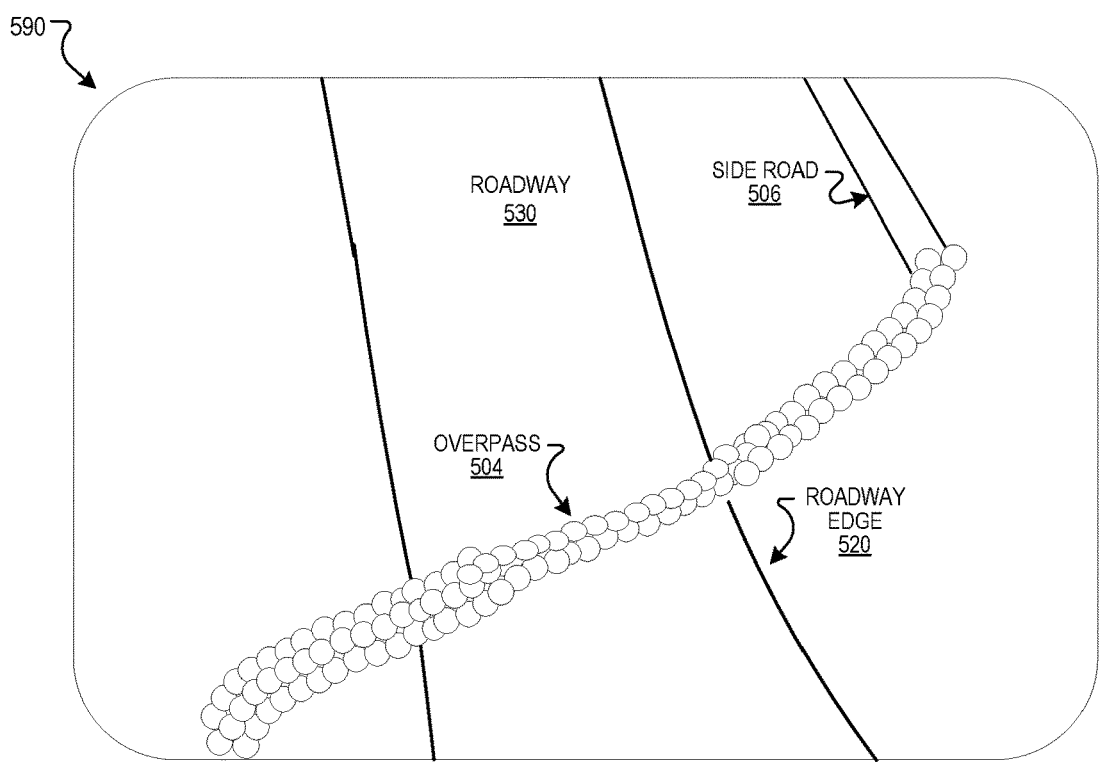

FIG. 5C shows an example unadjusted map 580 prior to adjustment by the road graph adjuster 350. FIG. 5D shows an illustration of an example overhead view of an adjusted map 590 after adjustment by the road graph adjuster 350.

The unadjusted map 580 includes updated surfel map data 175, based on the new sensor data 185, and current road graph data 320. Thus, the surfels, e.g., surfels representing the overpass 504, are misaligned with the road graph, e.g., the road graph segments representing the side road 506.

The road graph adjuster 350 applies the vector field difference 345 to the current road graph data 320. The vector field difference 345 is represented by example vectors 540. The road graph adjuster 350 can apply the vector field difference 345 to the road graphs segments representing the side road 506 in order to align the road graph of the unadjusted map 580 with the surfels of the unadjusted map 580.

FIG. 5D shows an adjusted map 590 including updated surfel map data 175. The updated map data includes the updated road graph data 165 and the updated surfel map data 175. The surfels and the road graph of the adjusted map 590 are realigned, compared to the unadjusted map 580. For example, the surfels representing the overpass 504 are aligned with the road graph segments representing the side road 506, similar to the relative positions of the overpass 504 and the side road 506 shown in FIG. 5A.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which can also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines can be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

[1] Embodiment 1 is a method comprising: storing a representation of an environment, the representation comprising (i) a surfel map having a plurality of surfels and (ii) a road graph; receiving new surfel data generated from new sensor measurements; adjusting one or more surfels in the surfel map based on the new surfel data; determining a vector field difference between the surfels of the stored surfel map and the adjusted one or more surfels for a particular location; and adjusting a portion of the road graph for the particular location based on the vector field difference.

[2] Embodiment 2 is the method of embodiment 1, wherein each of the surfels includes data representing a portion of a feature of the environment.

[3] Embodiment 3 is the method of any one of embodiments 1-2, wherein the portion of the road graph defines a boundary of a vehicle route.

[4] Embodiment 4 is the method of any one of embodiments 1-3, wherein the portion of the road graph comprises a line segment of the road graph.

[5] Embodiment 5 is the method of any one of embodiments 1-4, wherein adjusting the portion of the road graph based on the vector field difference comprises adjusting the portion of the road graph based on a vector field difference of one or more surfels.

[6] Embodiment 6 is the method of any one of embodiments 1-5, wherein the vector field difference of the one or more surfels comprises an average vector field difference of one or more surfels within a threshold proximity to the portion of the road graph.

[7] Embodiment 7 is the method of any one of embodiments 1-6, wherein the vector field difference of the one or more surfels comprises a vector field difference of at least one surfel having at least one shared positional coordinate with the road graph.

[8] Embodiment 8 is the method of any one of embodiments 1-7, wherein each portion of the road graph is mapped to one or more surfels, wherein adjusting the portion of the road graph based on the vector field difference comprises adjusting the portion of the road graph based on the vector field difference of the one or more surfels to which the portion of the road graph is mapped.

[9] Embodiment 9 is the method of any one of embodiments 1-8, wherein the new surfel data is generated based on output produced from a map algorithm.

[10] Embodiment 10 is the method of any one of embodiments 1-9, wherein the new surfel data is generated based on sensor data captured by a sensor of a vehicle.

[11] Embodiment 11 is the method of any one of embodiments 1-10, wherein each surfel comprises: coordinates in a three-dimensional coordinate system of the environment that characterize a position of the surfel in the environment, and a normal vector that characterizes an orientation of the surfel in the environment.

[12] Embodiment 12 is the method of any one of embodiments 1-11, wherein the surfel data includes latitude, longitude, and elevation data.

[13] Embodiment 13 is the method of any one of embodiments 1-12, wherein the surfel data includes pitch, yaw, and roll data.

[14] Embodiment 14 is a system comprising: one or more computers and one or more storage devices storing instructions that are operable, when executed by the one or more computers, to cause the one or more computers to perform the method of any one of embodiments 1 to 13.

[15] Embodiment 15 is a computer storage medium encoded with a computer program, the program comprising instructions that are operable, when executed by data processing apparatus, to cause the data processing apparatus to perform the method of any one of embodiments 1 to 13.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method comprising:
    storing a representation of an environment, the representation comprising (i) a surfel map having a plurality of surfels and (ii) a road graph, wherein the surfel map is generated from sensor observations received from a plurality of vehicles traveling in the environment, and wherein the road graph represents permissible paths of travel for an autonomous or semi-autonomous vehicle in the environment;
    receiving new surfel data generated from new sensor measurements at a particular location in the environment;
    comparing the new surfel data for a particular location in the environment to prior surfel data for the particular location in the surfel map;
    determining that the environment of the particular location has changed based on the comparison;
    in response, updating the surfel map for the particular location based on the new surfel data;
    determining that the updated surfel map satisfies one or more road graph updating criteria; and
    in response, performing a corresponding update to the road graph based on the update to the surfel map at the particular location, including:
        determining a vector field difference between the surfels of the stored surfel map and an adjusted one or more surfels of the updated surfel map for the particular location, and
        adjusting a portion of the road graph for the particular location based on the vector field difference between the surfels of the stored surfel map and the updated surfel map.

2. The method of claim 1, wherein each of the surfels includes data representing a portion of a feature of the environment.

3. The method of claim 1, wherein the portion of the road graph defines physical markings that define a boundary of a vehicle route.

4. The method of claim 1, wherein the portion of the road graph comprises a line segment of the road graph.

5. The method of claim 1, wherein adjusting the portion of the road graph based on the vector field difference comprises adjusting the portion of the road graph based on a vector field difference of one or more updated surfels of the updated surfel map and the road graph.

6. The method of claim 5, wherein the vector field difference of the one or more surfels comprises an average vector field difference of the updated surfel map within a threshold proximity to the portion of the road graph.

7. The method of claim 5, wherein the vector field difference of the one or more surfels comprises a vector field difference of at least one surfel having at least one shared positional coordinate with the road graph.

8. The method of claim 1, wherein each portion of the road graph is mapped to one or more surfels, wherein adjusting the portion of the road graph based on the vector field difference comprises adjusting the portion of the road graph based on the vector field difference of the one or more surfels to which the portion of the road graph is mapped.

9. The method of claim 1, wherein the new surfel data is generated based on output produced from a map algorithm.

10. The method of claim 1, wherein the new surfel data is generated based on sensor data captured by a sensor of a vehicle.

11. The method of claim 1, wherein each surfel comprises:
coordinates in a three-dimensional coordinate system of the environment that characterize a position of the surfel in the environment, and
a normal vector that characterizes an orientation of the surfel in the environment.

12. The method of claim 1, wherein the surfel data includes latitude, longitude, and elevation data.

13. The method of claim 1, wherein the surfel data includes pitch, yaw, and roll data.

14. A system comprising one or more computers and one or more storage devices storing instructions that are operable, when executed by the one or more computers, to cause the one or more computers to perform operations comprising:
storing a representation of an environment, the representation comprising (i) a surfel map having a plurality of surfels and (ii) a road graph, wherein the surfel map is generated from sensor observations received from a plurality of vehicles traveling in the environment, and wherein the road graph represents permissible paths of travel for an autonomous or semi-autonomous vehicle in the environment;
receiving new surfel data generated from new sensor measurements at a particular location in the environment;
comparing the new surfel data for a particular location in the environment to prior surfel data for the particular location in the surfel map;
determining that the environment of the particular location has changed based on the comparison;
in response, updating the surfel map for the particular location based on the new surfel data;
determining that the updated surfel map satisfies one or more road graph updating criteria; and
in response, performing a corresponding update to the road graph based on the update to the surfel map at the particular location, including:
determining a vector field difference between the surfels of the stored surfel map and an adjusted one or more surfels of the updated surfel map for the particular location, and
adjusting a portion of the road graph for the particular location based on the vector field difference between the surfels of the stored surfel map and the updated surfel map.

15. The system of claim 14, wherein each of the surfels includes data representing a portion of a feature of the environment.

16. The system of claim 14, wherein the portion of the road graph defines physical markings that define a boundary of a vehicle route.

17. The system of claim 14, wherein the portion of the road graph comprises a line segment of the road graph.

18. The system of claim 14, wherein adjusting the portion of the road graph based on the vector field difference comprises adjusting the portion of the road graph based on a vector field difference of one or more surfels.

19. The system of claim 18, wherein the vector field difference of the one or more surfels comprises an average vector field difference of the updated surfel map within a threshold proximity to the portion of the road graph.

20. A non-transitory computer readable storage medium encoded with instructions that, when executed by one or more computers, cause the one or more computers to perform operations comprising:
storing a representation of an environment, the representation comprising (i) a surfel map having a plurality of surfels and (ii) a road graph, wherein the surfel map is generated from sensor observations received from a plurality of vehicles traveling in the environment, and wherein the road graph represents permissible paths of travel for an autonomous or semi-autonomous vehicle in the environment;
receiving new surfel data generated from new sensor measurements at a particular location in the environment;
comparing the new surfel data for a particular location in the environment to prior surfel data for the particular location in the surfel map;
determining that the environment of the particular location has changed based on the comparison;
in response, updating the surfel map for the particular location based on the new surfel data;
determining that the updated surfel map satisfies one or more road graph updating criteria; and
in response, performing a corresponding update to the road graph based on the update to the surfel map at the particular location, including:
determining a vector field difference between the surfels of the stored surfel map and an adjusted one or more surfels of the updated surfel map for the particular location, and
adjusting a portion of the road graph for the particular location based on the vector field difference between the surfels of the stored surfel map and the updated surfel map.

* * * * *